(No Model.) 2 Sheets—Sheet 1.
S. D. STROHM.
CONDUIT FOR ELECTRICAL CONDUCTORS.
No. 262,499. Patented Aug. 8, 1882.
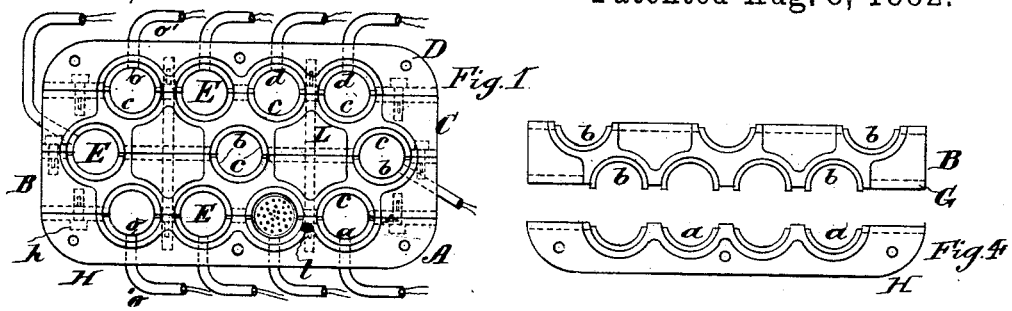
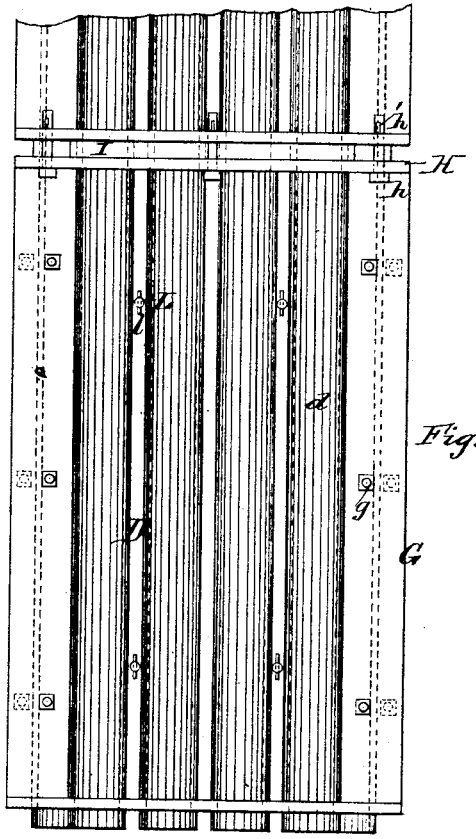
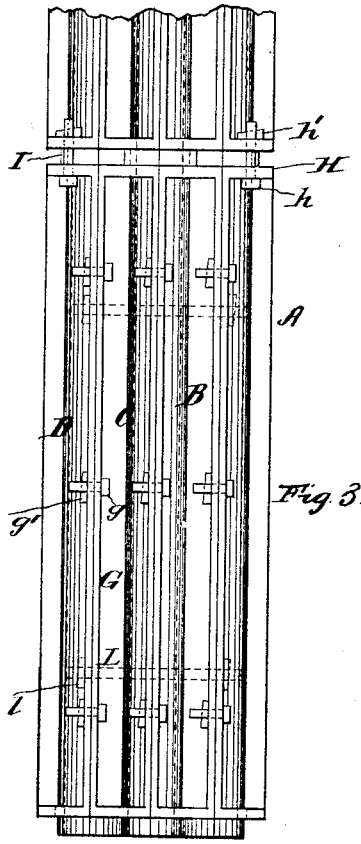
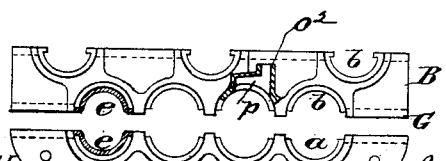
Witnesses:
S. J. Van Stavoren.
V. Connolly.
Inventor,
Sam'l D. Strohm
By Connolly Bros.,
Attorneys.

(No Model.) 2 Sheets—Sheet 2.
S. D. STROHM.
CONDUIT FOR ELECTRICAL CONDUCTORS.
No. 262,499. Patented Aug. 8, 1882.
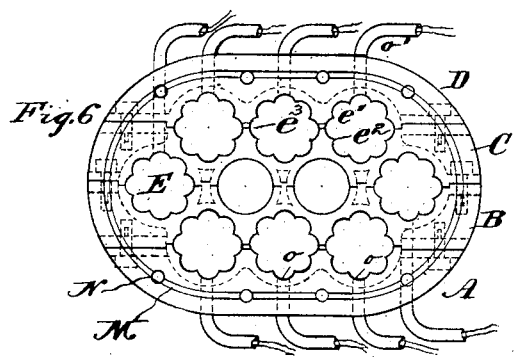
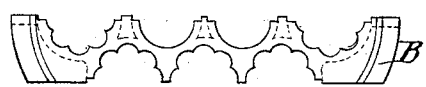
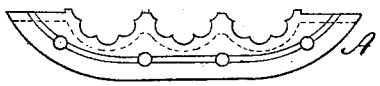
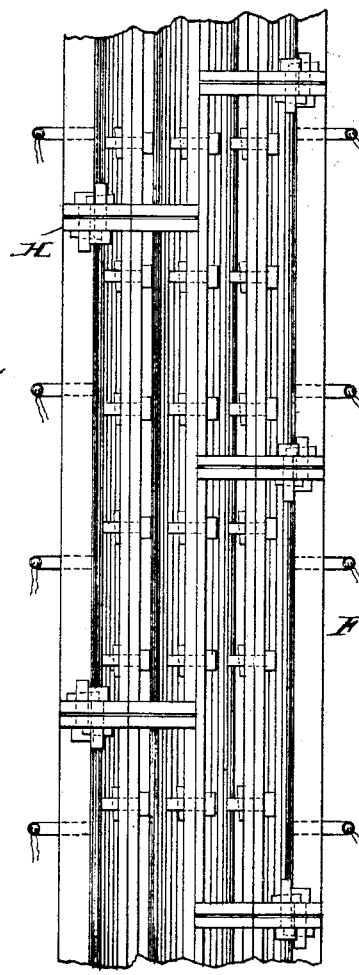
Witnesses:
S. J. VanStavoren,
T. Connolly
Inventor,
Samuel D. Strohm,
By Connolly Bros.
Attorneys.

UNITED STATES PATENT OFFICE.

SAMUEL D. STROHM, OF PHILADELPHIA, PENNSYLVANIA, ASSIGNOR OF ONE-HALF TO HARRISON SNYDER, OF SAME PLACE.

CONDUIT FOR ELECTRICAL CONDUCTORS.

SPECIFICATION forming part of Letters Patent No. 262,499, dated August 8, 1882.

Application filed February 19, 1881. (No model.)

*To all whom it may concern:*

Be it known that I, SAMUEL D. STROHM, a citizen of the United States, and a resident of the city of Philadelphia, in the county of Philadelphia and State of Pennsylvania, have invented certain new and useful Improvements in Conduits for Electrical Conductors, of which the following is a specification, reference being had to the accompanying drawings, wherein—

Figure 1 is an end elevation of my improvements; Fig. 2, a side elevation; Fig. 3, a plan. Figs. 4 and 5 are detail elevations. Fig. 6 is an end elevation of a slight modification in construction of my invention. Fig. 7 is a side elevation. Fig. 8 is a plan of the same, and Fig. 9 is a detail elevation.

My invention has for its object to provide a form of covering for wires used for the conveyance of electricity employed for telegraphic and telephonic purposes, for heating, lighting, and other objects.

My invention consists primarily of a conduit composed of a series of chambered sections of peculiar construction, secured together in such a manner as to form a secure insulating-covering for wires or cables employed for the transmission of electrical currents, as hereinafter described and specifically claimed.

In carrying my invention into effect I construct chambered sections of iron, glass, clay, or other material capable of being cast, molded, drawn, or worked into the shape required, such sections having grooved or channeled sides, so that when brought together they compose a cylinder or equivalent figure or body having longitudinal orifices or passages for the electrical conducting wires, cables, or tubes.

Referring to the accompanying drawings, A B C D represent chambered sections of any suitable material—such, for example, as iron, glass, clay, or wood. The sections A and D have their sides formed with longitudinal semicircular channels *a d*. The sections B C have both their vertical sides formed with like channels *b c*, which register with each other and with the channels *a d* of the sections A D, so that when said several sections are brought duly together they will compose a cylinder or equivalent elongated body having longitudinal passages or chambers E E for the reception of wires, cables, or other equivalent electrical conductors. Said sections are also formed with longitudinal and transverse flanges G H, through which pass bolts *g h*, provided with keys *g' h'*, whereby said sections are united longitudinally and end to end.

If desired, packing-rings, of metal, or other material, may be inserted between the flanges to form tight joints, and the sections should have hollow bosses I provided at one end and corresponding sockets at the other end, so as to form couplings when fitted together.

If desired, bolts of sufficient length to pass through the several sections laterally or from one side of the conduit through the same to the other side may be provided. Such bolts are shown at L, having keys *l*.

If desired, an insulating material of any suitable kind may be used as a lining for the passages E, such lining being shown at *e* in Fig. 5. Should tubes or cylindrical cables be placed inside said passages, the latter may have their walls longitudinally fluted or corrugated, as shown at *e'*, Fig. 6, whereby such tubes or cables may find bearings on the ridges $e^2$.

The sections may also be formed with transverse ribs or beads M on their ends and corresponding grooves on their opposite ends, which receive said ribs or beads when the sections are brought together, thus forming a packing, and said sections may also have dowels N for the purpose of rendering the structure firm and preventing the joints from opening.

The sections may have their respective joints in like vertical planes, as shown in Figs. 2 and 7; or they may be arranged to break joints, as shown in Fig. 8.

To permit the connecting-wires to issue separately at various points, the sections are formed with lateral openings *o o*, which may, if desired, be provided with hollow branches *o'*, fastened to hollow bosses $o^2$, such openings, when not occupied by said wires, having screw-caps or other covers to afford room for making connections between the main cable or conductor and branches. The chambered sections may be formed with annular grooves or other suitable recess which will furnish space for such purpose, as shown at *p* in Fig. 5.

The conduit or covering thus formed may be laid under ground or upon the surface thereof, or elevated upon poles or other supports, and may be introduced into buildings through or upon the walls of the same in the manner of gas-pipes. When made of suitable material and properly put together it will form a perfectly-tight insulating conduit or covering for electrical conducting wires and cables, protecting such conductors from adverse external influences and preventing leakage. In case of a break either in the conduit itself or its contents, or if any additional conductor be required to be inserted therein, any section or sections may be readily removed and replaced without requiring the disturbance of the whole structure.

What I claim as my invention is as follows:

1. A conduit for electrical conductors, composed of the sections A B C D, having their opposing sides respectively grooved or channeled to form passages, said sections having transverse and longitudinal flanges, whereby they are bolted together, substantially as shown and described.

2. A conduit for electrical conductors, consisting of chambered sections, substantially as described, having longitudinal channels with fluted sides, forming bearings for tubes or cables, substantially as set forth.

In testimony that I claim the foregoing I have hereunto set my hand this 14th day of February, 1881.

SAMUEL D. STROHM.

Witnesses:
S. J. VAN STAVOREN,
CHAS. F. VAN HORN.